March 26, 1929.  C. P. GEBAUER  1,706,487
VEHICLE SPRING, PARTICULARLY FOR AUTO VEHICLES
Filed Dec. 9, 1926  2 Sheets-Sheet 1
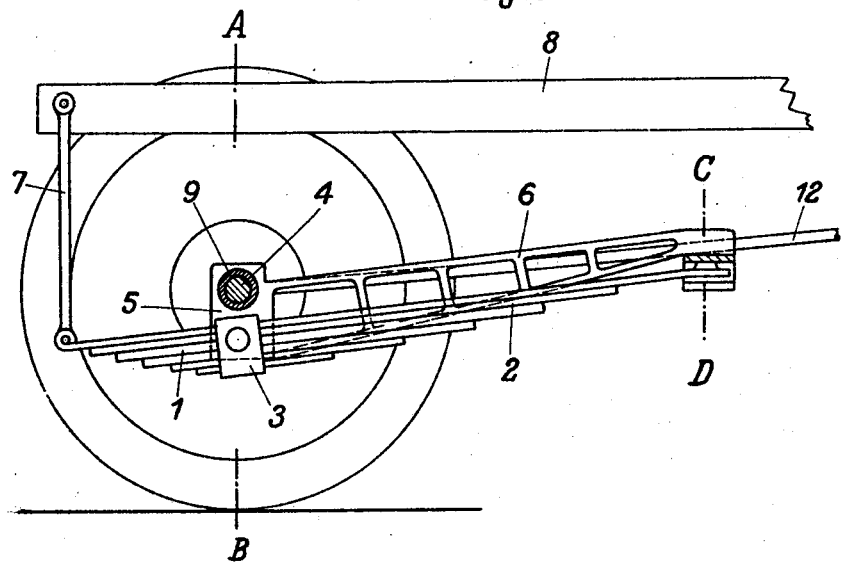
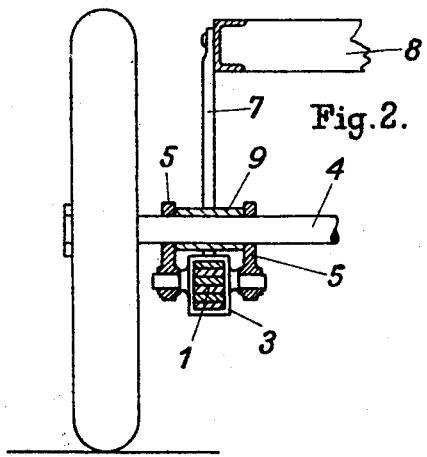
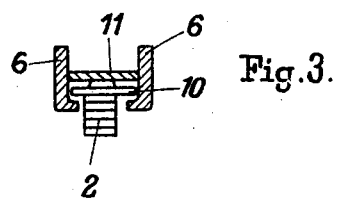
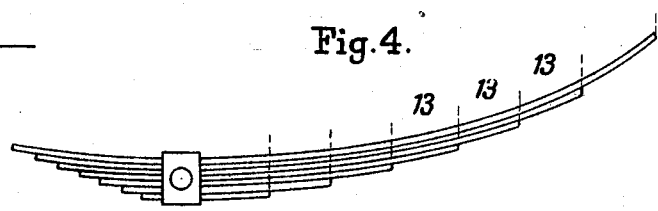
Inventor:
Carl Paul Gebauer March 26, 1929.  C. P. GEBAUER  1,706,487

VEHICLE SPRING, PARTICULARLY FOR AUTO VEHICLES

Filed Dec. 9, 1926  2 Sheets-Sheet 2

Inventor:
Carl Ruwil Gebauer

Patented Mar. 26, 1929.

1,706,487

UNITED STATES PATENT OFFICE.

CARL PAUL GEBAUER, OF NUREMBERG, GERMANY.

VEHICLE SPRING, PARTICULARLY FOR AUTOVEHICLES.

Application filed December 9, 1926, Serial No. 153,581, and in Germany October 12, 1926.

Figure 5:
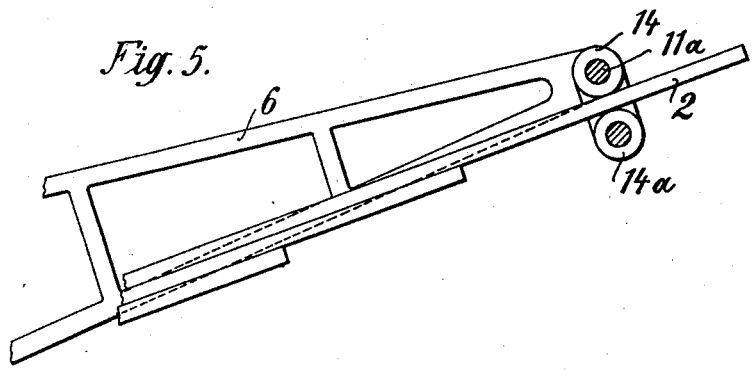
Figure 6:
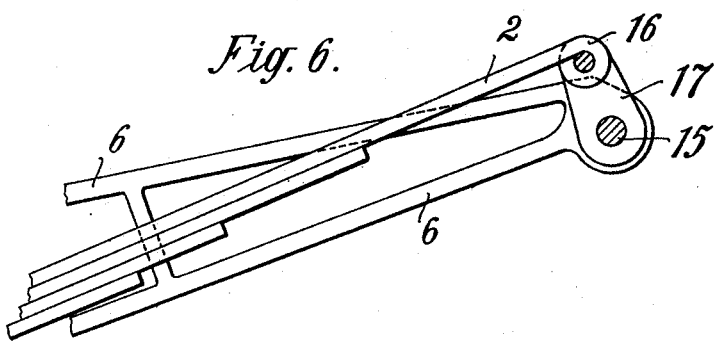
Figure 7:
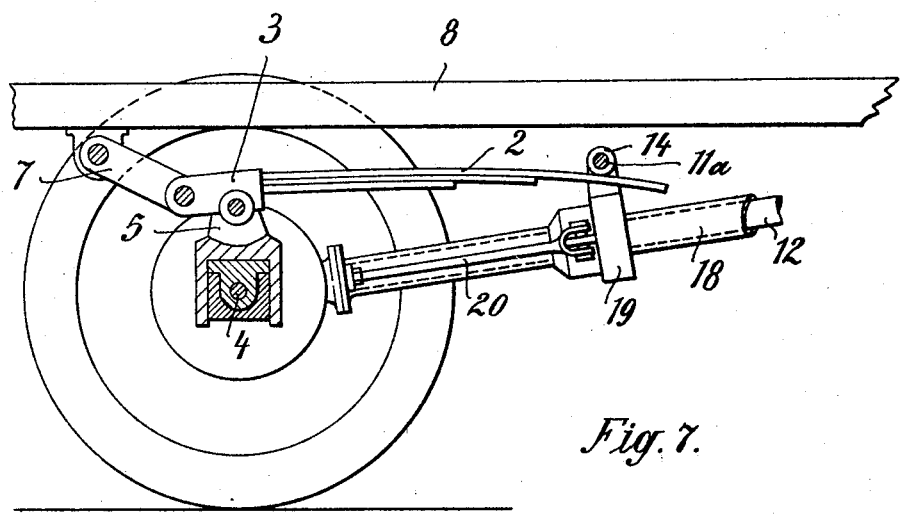

This invention has reference to vehicle springs, and it is intended to devise means to facilitate and improve the construction and mode of application of such springs and to increase the efficiency and generally improve the adaptability thereof. The invention among other uses may be particularly applied to motor-vehicles and the like without, however, having its scope restricted to such manner of application, and in its broad features the invention comprises a leaf spring disposed below or above the axle and comprising two lever arms of unequal length and of which the shorter lever arm constitutes the load-carrier proper, while the long lever arm is adapted to displaceably bear against and upon a relatively stationary support. Among other objects and advantages of this invention it is one of its important objects as compared with the usual arrangement of leaf springs that a gradual but still continuous absorption of the jerks and jars is produced combined with a very rapid subsequent damping of the oscillations. These favorable results are particularly noticeable in the case of an inclined arrangement of the springs in view of the fact that a component of force in the direction of the movement of the vehicle is developed upon the expansion of the spring subsequent to the occurrence of jerks and jars. It has also been ascertained that the continuity of the absorption of jerks and jars is assisted in case different radii of curvature are imparted to the outer portions of the spring which become narrower at their extremities, and in accordance with the particular strength and thickness of the layers of spring leaves. Owing to constructional considerations, however, the employment of a spring beam showing these features is greatly facilitated, if carried out in accordance with my invention which will now be more fully described with reference to the accompanying drawing, showing by way of exemplification an embodiment of the principles of this invention in Figure 1 partly in elevation and partly in longitudinal section through the vehicle frame with the spring arrangement.—Figure 2 is a section on the line A—B of Figure 1, and Figure 3 is a section on the line C—D through the sliding arrangement in Figure 1, taken through the long lever arm of the spring at the stationary supporting means; and Figure 4 is a side view of a leaf spring or laminated spring with different radii of curvature in accordance with the varying strength and thickness of spring leaves. Figures 5, 6 and 7 are side elevations of modified constructions to be referred to.

A leaf spring consisting of two lever arms 1 and 2 and confined in the usual manner by a spring band 3 is rockingly or rotatably disposed in the projections 5 of two rigid grate bars or frame-like supporting beams 6 below the axle 4 of a motor vehicle and in the position of rest it is retained at an inclination relatively to the horizontal direction. Upon the short spring lever arm 1 serving as the load carrier proper the bearing support 7 of the frame 8 is pivotally secured. The long lever arm 2 however, by means of a slide, sliding carriage 10 or a system of rollers is caused to bear against a supporting surface 11 at the end of two rigid bars or supporting beams 6 which are preferably provided upon the axle sleeve 9. The use of rollers as a bearing means for the long spring arm 2 is shown in Figure 5 of the drawing in which the two rollers 14 and 14$^a$ are secured at the end of the beam and serve as bearing for the long spring arm 2 which bears particularly upon the stud 11$^a$ by means of the roller 14 mounted thereon. In the modification according to Figure 6 the connection between the supporting beam or beams 6 and the long spring arm 2 is effected by link connection, a connecting link 17 being provided which is pivotally secured at 16 to the spring arm 2 and at 15 to the beam 6. The rear wheel axle is then retained in position with relation to the vehicle frame by means of the Cardan-shaft 12, as shown in Figure 7. In this modification the extremity of the long spring-arm 2 is slidingly guided in engagement with the roller 14 rotatable on the stud 11$^a$ and disposed in the supporting member 19 rockingly mounted upon the surrounding sleeve 18 of the Cardan-shaft 12, the said member 19 being kept at the proper distance from the rear wheel axle by suitable means, as for instance by the link-rod 20, as shown in the drawing. Now, in the case of shocks and jars occurring upon the wheel axle as a result of obstacles and unevenness of the road, such shocks or jars will be gradually and continuously absorbed by the long lever arm 2 of the spring, while the subsequently occurring reciprocatory oscillation of the spring is dampened by the short lever arm 1, while at the same time a conversion of part of the vertical forces into horizontal forces is effected. As has already been mentioned, it is possible with this arrangement of springs to make use of springs which in the several spring sections 13, formed by the individual thicknesses of spring portions, (Figure 4) present different radii of curvature.

It is obvious and should be understood that the arrangement of springs in accordance with this invention may be employed also for other purposes, such as for instance for the spring mounting of the saddle and of the front fork in cycles and the like, and that the invention is susceptible of modifications in various particulars without departing from the spirit and scope of the invention or sacrificing any of its advantages within the meaning of the appended claims.

I claim:—

1. In a vehicle spring arrangement in combination, a vehicle member and a longitudinally extending compound flat spring relatively pivotally superposed, substantially rigid supporting means in which said member is movably mounted and bearing against the free end of said flat spring for longitudinal displacement with relation thereto.

2. In a vehicle spring arrangement in combination, substantially rigid, longitudinally extending supporting means, and a longitudinally extending compound flat-spring, spacedly superimposed and pivotally connected intermediate of and at unequal distances from the ends of the spring, a vehicle member rockingly supported on the short end member of the spring, and means on the long end member of the spring bearing on the supporting means for longitudinal displacement with relation to each other.

3. In a vehicle spring arrangement in combination, substantially rigid, longitudinally extending supporting means, and a longitudinally extending laminated compound flat-spring, being spacedly superimposed and pivotally connected intermediate of and at unequal distances from the ends of said spring, a vehicle member rockingly supported on the short end member of the spring, the relatively longer end member of the spring being held in contact with said supporting means and longitudinally displaceable thereon, a vehicle axle mounted for rotary movement in the supporting means near the pivoting point of the spring.

4. In a vehicle spring arrangement in combination, substantially rigid, longitudinally extending supporting means, a vehicle axle, rotatably mounted in one end portion of said supporting means, a compound flat spring, substantially in the vertical plane of said supporting means and inclined with relation thereto, said spring and the supporting means being spacedly superimposed, means adjacent the vehicle axle for pivotally supporting the spring from the supporting means and disposed intermediate of and at unequal distances from the ends of the spring, means for rockingly supporting a vehicle member on the short end portion of the spring and means for holding the relatively longer spring end portion in longitudinally displaceable contact with the supporting member.

5. In a vehicle spring arrangement in combination, a longitudinally extending supporting beam, a vehicle axle, rotatably and transversely mounted near one end portion of said beam, a flat compound vehicle spring, longitudinally spaced with relation to the beam, and pivotally secured to the supporting beam adjacent the vehicle axle, and at unequal distances from the end of the spring, and means to cause the relatively longer end of said spring to be engaged with the supporting beam for longitudinal displacement thereon 6. In a vehicle spring arrangement in combination, a vehicle wheel a vehicle axle on said wheel, a longitudinally extending supporting beam, mounted on said axle, a compound flat spring pivotally mounted on the supporting beam at unequal distances from the ends of the spring and adapted for sliding engagement with the beam at the relatively longer end portion of the spring, said spring comprising superimposed serially arranged sections of spring layers increasing in thickness towards the relatively shorter end portion of the spring.

7. In a vehicle spring arrangement in combination, a vehicle wheel a vehicle axle on said wheel, a longitudinally extending supporting beam, mounted on said axle, a compound flat spring of unequal thickness at its ends, and fulcrumed near its thicker end to the supporting beam, and adapted for sliding engagement with the beam at the thinner end of the spring, and means to support a vehicle member on the thicker end of the spring.

8. In a vehicle spring arrangement in combination, a vehicle wheel a vehicle axle on said wheel a longitudinally extending supporting beam, mounted on said axle, a compound flat spring of different thickness at its ends and comprising superimposed connected spring layers of different curvatures, means to fulcrum the spring to the beam at the thicker end of the spring, the other thinner end of the spring being longitudinally displaceably engaged with the beam.

In testimony whereof I affix my signature.

CARL PAUL GEBAUER.